US012664918B2

(12) United States Patent
Gady et al.

(10) Patent No.: US 12,664,918 B2
(45) Date of Patent: Jun. 23, 2026

(54) POWERED RETAIL SIGNAGE ASSEMBLY WITH CONSISTENT VISIBILITY IN DIFFERENT LIGHTING CONDITIONS

(71) Applicant: Apple Inc., Cupertino, CA (US)

(72) Inventors: Jean-Marc Gady, Los Altos, CA (US); Allison Inouye, San Francisco, CA (US); William C. Min, San Jose, CA (US); Evan M. Liao, Oakland, CA (US); Nicholas E. Corti, San Francisco, CA (US); Alex S. Yeh, Santa Clara, CA (US); Russell John Kaaihue Heirakuji, San Jose, CA (US)

(73) Assignee: Apple Inc., Cupertino, CA (US)

( * ) Notice: Subject to any disclaimer, the term of this patent is extended or adjusted under 35 U.S.C. 154(b) by 396 days.

(21) Appl. No.: 18/134,367

(22) Filed: Apr. 13, 2023

(65) Prior Publication Data

US 2024/0071266 A1 Feb. 29, 2024

Related U.S. Application Data

(60) Provisional application No. 63/402,848, filed on Aug. 31, 2022.

(51) Int. Cl.
*G09F 13/04* (2006.01)
*G09F 13/22* (2006.01)

(52) U.S. Cl.
CPC .......... *G09F 13/0409* (2013.01); *G09F 13/22* (2013.01); *G09F 2013/222* (2013.01)

(58) Field of Classification Search
CPC ................. G09F 13/0409; G09F 13/22; G09F 2013/222; G09F 13/08; G09F 13/04; G09F 13/0404; G09F 13/0413
See application file for complete search history.

(56) References Cited

U.S. PATENT DOCUMENTS

| | | | | |
|---|---|---|---|---|
| 4,424,449 A | 1/1984 | O'Brill | | |
| 5,050,327 A | 9/1991 | Woltman | | |
| 5,307,205 A | 4/1994 | Ludwig et al. | | |
| 5,485,145 A * | 1/1996 | Sniff | G08B 7/062 | 340/815.4 |

(Continued)

FOREIGN PATENT DOCUMENTS

| | | | |
|---|---|---|---|
| EP | 0497506 A2 | 8/1992 | |
| WO | 2014179101 A1 | 11/2014 | |
| WO | 2017151666 A1 | 9/2017 | |

*Primary Examiner* — Gary C Hoge
(74) *Attorney, Agent, or Firm* — Sterne, Kessler, Goldstein & Fox P.L.L.C.

(57) ABSTRACT

Systems disclosed herein are directed to a powered retail signage assembly having, inside a housing, a multi-layer translucent indicia panel and a light source panel emitting light to the rear of the multi-layer translucent indicia panel. The multi-layer translucent indicia panel includes a front tinted layer forming an indicium exposed on a front surface of the housing and a rear diffusion layer laminated with the front tinted layer at the back of the front tinted layer. The light emitted from the light source panel is diffused by the diffusion layer and transmitted through the tinted layer. The indicium appears brighter or darker than the front surface of the housing based on an external light condition.

31 Claims, 9 Drawing Sheets
(2 of 9 Drawing Sheet(s) Filed in Color)

(56) References Cited

U.S. PATENT DOCUMENTS

| | | | | |
|---|---|---|---|---|
| 5,641,221 | A * | 6/1997 | Schindele | G09F 13/22<br>315/84 |
| 6,171,117 | B1 * | 1/2001 | Chien | F21S 8/035<br>439/86 |
| 6,416,844 | B1 * | 7/2002 | Robson | B44C 5/04<br>428/161 |
| 9,272,672 | B2 * | 3/2016 | Vo | B60R 13/005 |
| 2001/0053076 | A1 * | 12/2001 | Chien | H02G 3/14<br>362/84 |
| 2003/0230017 | A1 * | 12/2003 | Geyer | G09F 13/04<br>40/544 |
| 2006/0176711 | A1 * | 8/2006 | Wang | B60R 13/005<br>362/555 |
| 2007/0124970 | A1 | 6/2007 | Hjaltason | |
| 2008/0010879 | A1 * | 1/2008 | Kaoh | G09F 13/22<br>40/570 |
| 2008/0016734 | A1 * | 1/2008 | Basha | G09F 13/04<br>40/552 |
| 2010/0154261 | A1 * | 6/2010 | Bozlo | G09F 21/049<br>156/247 |
| 2011/0219648 | A1 | 9/2011 | James et al. | |
| 2012/0057342 | A1 * | 3/2012 | Shih | G02B 6/006<br>362/311.01 |
| 2015/0121732 | A1 * | 5/2015 | Aho | G09F 13/0413<br>40/541 |
| 2015/0176832 | A1 * | 6/2015 | Metz | F21V 33/0044<br>362/89 |
| 2021/0158728 | A1 * | 5/2021 | Castillo | G09F 13/005 |
| 2022/0304247 | A1 * | 9/2022 | Nolin | A01G 9/02 |
| 2023/0250941 | A1 * | 8/2023 | Arai | G09F 21/048<br>362/546 |

* cited by examiner

POWERED RETAIL SIGNAGE ASSEMBLY WITH CONSISTENT VISIBILITY IN DIFFERENT LIGHTING CONDITIONS

CROSS-REFERENCE TO RELATED APPLICATION(S)

This application claims the benefit of U.S. Provisional Patent Application No. 63/402,848, titled “POWERED RETAIL SIGNAGE ASSEMBLY WITH CONSISTENT VISIBILITY IN DIFFERENT LIGHTING CONDITIONS” filed on Aug. 31, 2022, the disclosure of which is incorporated by reference herein in its entirety.

FIELD

The described embodiments relate generally to a powered, illuminated signage system. More particularly, the present embodiments relate to a powered signage assembly that maintains maximum legibility in all lighting conditions.

BACKGROUND

Signs may be any type of graphical display for conveying information (e.g., by text, graphics, or other indicia) to audiences about commercial establishments. Such information on the signs may provide legible information while providing aesthetic features through display of symbols and graphics. For instance, in retail stores or other urban areas, information about a company’s products or identity may be advertised or otherwise publicly displayed by the signs. Such a sign can be designed in various ways with specific materials and colors and may be illuminated. In addition, the information are often presented having a visual contrast with, for example, a background of the signs for clear visibility to any audiences. However, visibility of a sign can vary depending on external light characteristics, e.g., outdoor or indoor environments. The visibility of a given sign may be better in indoor environments than in outdoor environments, or vice versa. Systems are needed for providing easily legible signage that appears consistently under varying conditions, including variable light intensity, which may depend on both exterior and interior conditions. Further, systems are needed for providing clear visibility in any light condition without requiring light or locational adjustment of the signage itself.

SUMMARY

In some embodiments, a powered signage assembly includes a front housing panel having an opening and a multi-layer translucent indicia panel. The multi-layer translucent indicia panel includes a front tinted layer and a light source panel disposed to the rear of the indicia panel. The tinted layer includes a protrusion forming an indicium fitted within the opening and having a front surface flush with a front surface of the front housing panel. Light from the light source panel is diffused by the diffusion layer and transmitted through the tinted layer, such that the indicium is illuminated to visually contrast with the front surface of the front housing panel such that: in a first external light condition, the indicium appears brighter than the front surface of the front housing panel, and in a second external light condition, the indicium appears darker than the front surface of the front housing panel.

In some embodiments, a powered signage panel includes a front display panel having openings therethrough and a multi-layer translucent indicia panel that includes a front tinted layer and a rear diffusion layer. The front tinted layer includes protrusions disposed within the openings such that the protrusions occupy the entirety of the openings. The rear diffusion layer is laminated with the front tinted layer. The multi-layer translucent panel is configured to effect visual contrast between the protrusions and the front display panel such that: in an indirect external light condition, the protrusions appear illuminated relative to the front display panel due to light emitted through the protrusions from the powered light source panel, and in a direct external light condition, the protrusions appear darker than in the indirect external light condition due to external light reflected off of the protrusions.

In some embodiments, a powered signage system includes: a housing a front panel, the front panel having an opening therethrough and a front surface, e.g., with a white appearance, the housing forming an enclosure. The system further includes a multi-layer translucent indicia panel including a front tinted layer formed of a tinted translucent acrylic, e.g., with a grey appearance, and comprising an integral protrusion forming an indicium fitted within the opening, wherein the protrusion has a front surface flush with the front surface of the front panel of the housing; and a rear diffusion layer formed of a translucent acrylic and laminated to the back of the front tinted layer. An internal light source panel is disposed within the enclosure spaced apart from the indicia panel and configured to provide an internal light, wherein the light source panel emits light toward the rear diffusion layer. The light from the light source panel is diffused by the diffusion layer and transmitted through the front tinted layer, such that the indicium is illuminated to visually contrast with the front surface of the front housing panel throughout changing exterior light conditions without changing light output characteristics of the light source panel.

BRIEF DESCRIPTION OF THE DRAWINGS

The disclosure will be readily understood by the following detailed description in conjunction with the accompanying drawings, wherein like reference numerals designate like structural elements. The patent or application file contains at least one drawing executed in color. Copies of this patent or patent application publication with color drawing(s) will be provided by the Office upon request and payment of the necessary fee.

FIG. 7A is a photograph taken under a low-intensity external light condition, and FIG. 7B is a photograph taken under a high-intensity external light condition.

DETAILED DESCRIPTION

Figure 1:
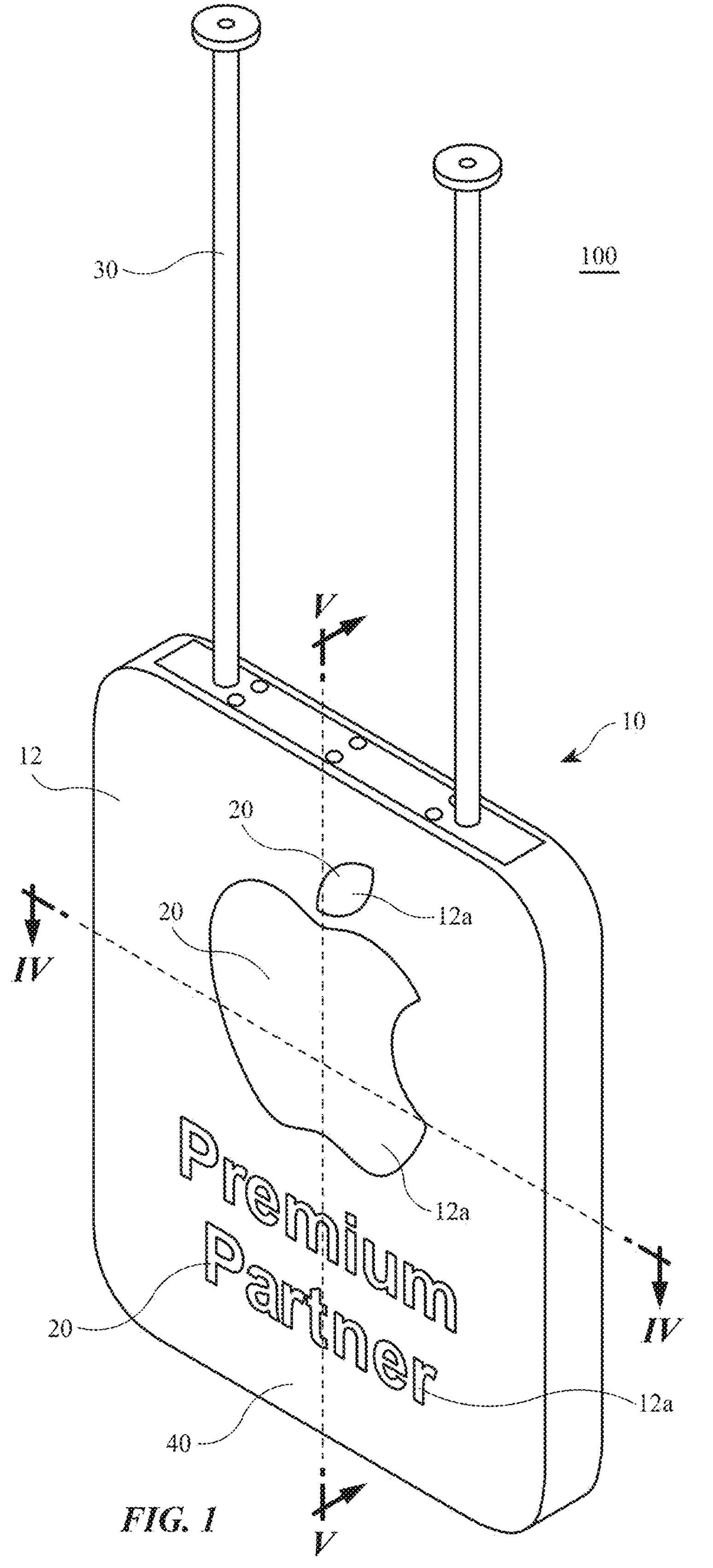
FIG. 1 shows a perspective view of a signage assembly according to some embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a signage system that maintains maximum legibility in all lighting conditions. Such signage systems may be used for delivering a message or otherwise conveying information to a viewer, and may be used, for example, in retail stores, museums, travel terminals, public spaces, or other places. Such signage systems may be provided in a wide range of forms, such as hanging signs, window signs, pylon signs, monument signs, information placards, etc., to be used indoors or outdoors. Such signage systems can deliver clear visibility to viewers in all light conditions.

However, lighted signage systems involve challenges in being used in different lighting environments, or when a lighting environment changes. For example, a lighted signage in an outdoor environment, where external incident light (e.g., sunlight) is high and unpredictable due to, e.g., time of the day, season, shades, etc. may not be as clearly visible as in an indoor environment, where external incident light on the sign is relatively low-intensity and stable, or vice versa. In addition, light reflection or an object forming a shade on the window signage system may degrade legibility of the information. Challenges in this context include maintaining clear visual contrast between communicative information of the signage and a surrounding surface thereof across varied environments without requiring a change in internal illumination characteristics (e.g., from internal powered light sources) of the signage system.

In some signage system embodiments discussed herein, signage can be clearly shown under various lighting conditions, indoor or outdoor, without intervention (e.g., without manually or automatically changing internal light settings or location of the signage itself or without using sensing devices for detecting and making changes based environment changes and/or changing internal light conditions). Some embodiments provide a signage system having high contrast between displayed indicia (distinct marks, e.g., logo, text, symbols) and a background surrounding the indicia, in a variety of external lighting conditions. In particular, when both the indicia and the background have light color (e.g., white), given that light is by its nature bright, it is a challenge to provide clear contrast (i.e., visual differentiation) with illuminated indicia on such a bright light background, which reflects a high percentage of incident light, particularly across a variety of external lighting conditions.

In some embodiments the visual contrast between indicia and its surrounding background on the sign becomes inverted by a change in the environment light condition. That is, the indicia may appear darker than its surrounding background in one external light condition (e.g., in a high-intensity external light condition, like direct sunlight) and the indicia may appear lighter than its surrounding background in a different external light condition (e.g., in a low-intensity external light condition, like shaded, or indoors). Such inversion of contrast between indicia and its surrounding background on the sign takes place with no change in the internal light of the sign. Such external light conditions are characteristics of the environment outside of the sign, not generated or caused by the sign, and may also be referred to as environmental light conditions.

Some embodiments described in more detail below provide a sign (signage assembly) including a dual-layer translucent lens that forms indicia on a front surface of a sign. A front layer of the lens has protrusions that shape the indicia, and that extend through correspondingly-shaped openings in a front panel of the sign. The dual-layer lens is illuminated from behind, by a light source within a housing of the light. The rear layer of the lens is lighter than the front layer. For example, the rear layer may be a frosted diffusion layer with, e.g., a white color family, while the front layer may be a tinted darker layer having a darker tint (shade and/or color) than the rear layer.

In low-intensity external light conditions (e.g., indoors in a retail store), light from the light source is diffused by the rear layer and passes through the front layer, thereby illuminating the indicia, and making it appear brighter than the surrounding front surface of the sign. In high-intensity external light conditions however, (e.g., outdoors in sunlight), external light reflects off of the front tinted layer and—due to the tint—causes the indicia to appear darker than the surrounding front surface of the sign.

In such high-intensity external light conditions, the external light overwhelms the internal light generated by the sign's internal light source, at the same time making the surrounding portion of the sign appear much brighter. The tinted front layer takes advantage of the high-intensity external light to provide a sharper contrast to the indicia, by making it appear darker than the surrounding surface of the sign. Thus, embodiments of signage assemblies described herein maintain high contrast and legibility, making their indicia appear variously lighter or darker than their surrounding surface depending on external lighting conditions, without any change to the operation of the signage assembly itself.

These and other embodiments are discussed below with reference to the accompanying figures. However, those skilled in the art will readily appreciate that the detailed description given herein with respect to these figures is for explanatory purposes only and should not be construed as limiting.

FIG. 1 is a perspective view of a powered signage assembly 100 according to some embodiments. Signage assembly 100 includes a housing 10 with a front panel 12, which displays indicia 20. As shown, indicia 20 can include a logo and text, though indicia 20 could be any other shape(s) or symbol(s) to be displayed by signage assembly 100 (e.g., other logos, text, arrows).

In some contexts, signage assembly 100 may be located inside or outside of a retail store, and may be mounted to a wall, hung from the ceiling, attached to a glass window/door, etc. Each of these—and other—locations may have different external lighting conditions, due to, for example, type and placement of indoor lights or windows, time of day, season, weather conditions, or shade (e.g., from retail fixtures, the environment, or people).

Figure 2:
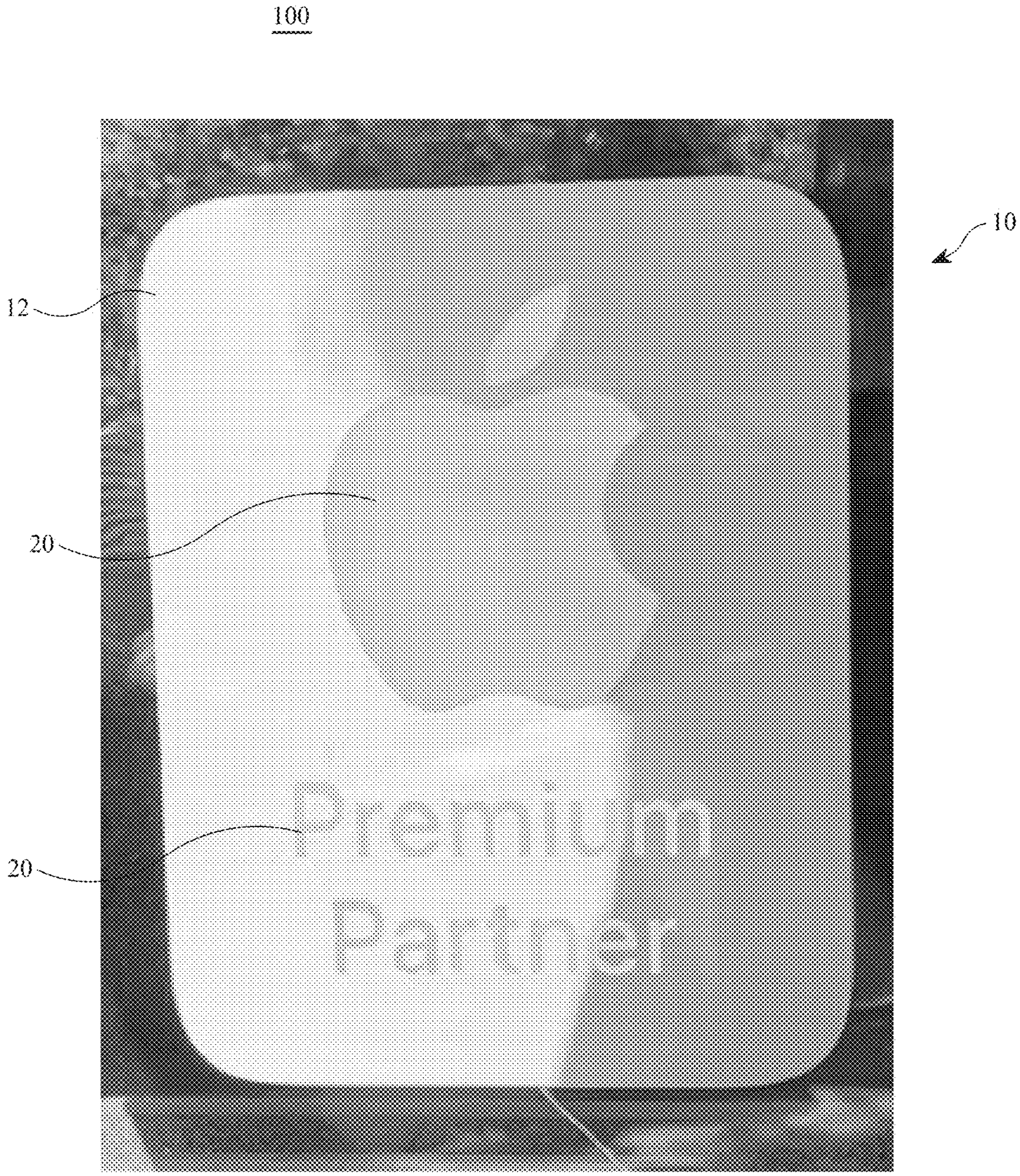
FIG. 2 shows a photographic front view of a partially-shaded signage assembly in an outdoor environment.

FIG. 2 shows a photographic example of a front view of a partially-shaded signage assembly 100 in an outdoor environment. In this example, signage assembly 100 is mounted to a glass window receiving direct sunlight with signage assembly 100 partially shaded.

The left half portion of signage assembly 100 in FIG. 2 is receiving the direct sunlight (e.g., daytime), and the color of front panel 12 appears a first color (e.g., white, which may be its painted color) while the color of indicium 20 appears a second color (e.g., tinted grey). The right half portion of signage assembly 100 in FIG. 2 is blocked by an object (e.g., person, tree, building, etc.) from the direct sunlight, and front panel 12 appears slightly darker due to the shade but still is recognizably bright in color (e.g., white) while indicium 20 appears brighter than front panel 12 in color. The example photograph demonstrates that visibility of signage is clear under changing circumstances such as transitory shade. Notably, the shade does not affect the appearance of the indicia, only its appearance relative to the surrounding portion of front panel 12, allowing it to maintain crisp, clean contrast on both sides, shaded and unshaded. This is due to the balancing of internally-generated light from signage assembly 100 and externally-reflected light due to the makeup of indicia 20, as will be discussed in greater detail below. In addition, the second color of indicium 20 may be a grey color family but its value for determining color tones can vary.

Contrast between front panel 12 and indicium 20 can result from any characteristic that provides visually distinguishable differences. Color for example. However, colors of the front panel 12 and indicium 20 are not limited to the above example of white and/or grey. For example, the first color and the second color may be in the same hue but different tint, tone, or shade. For example, the first color may be any hue (e.g., white, red, green) with hue at 0° while the second color may be same hue (or a different hue) at 0° while tinted or shaded a different amount.

Figure 3:
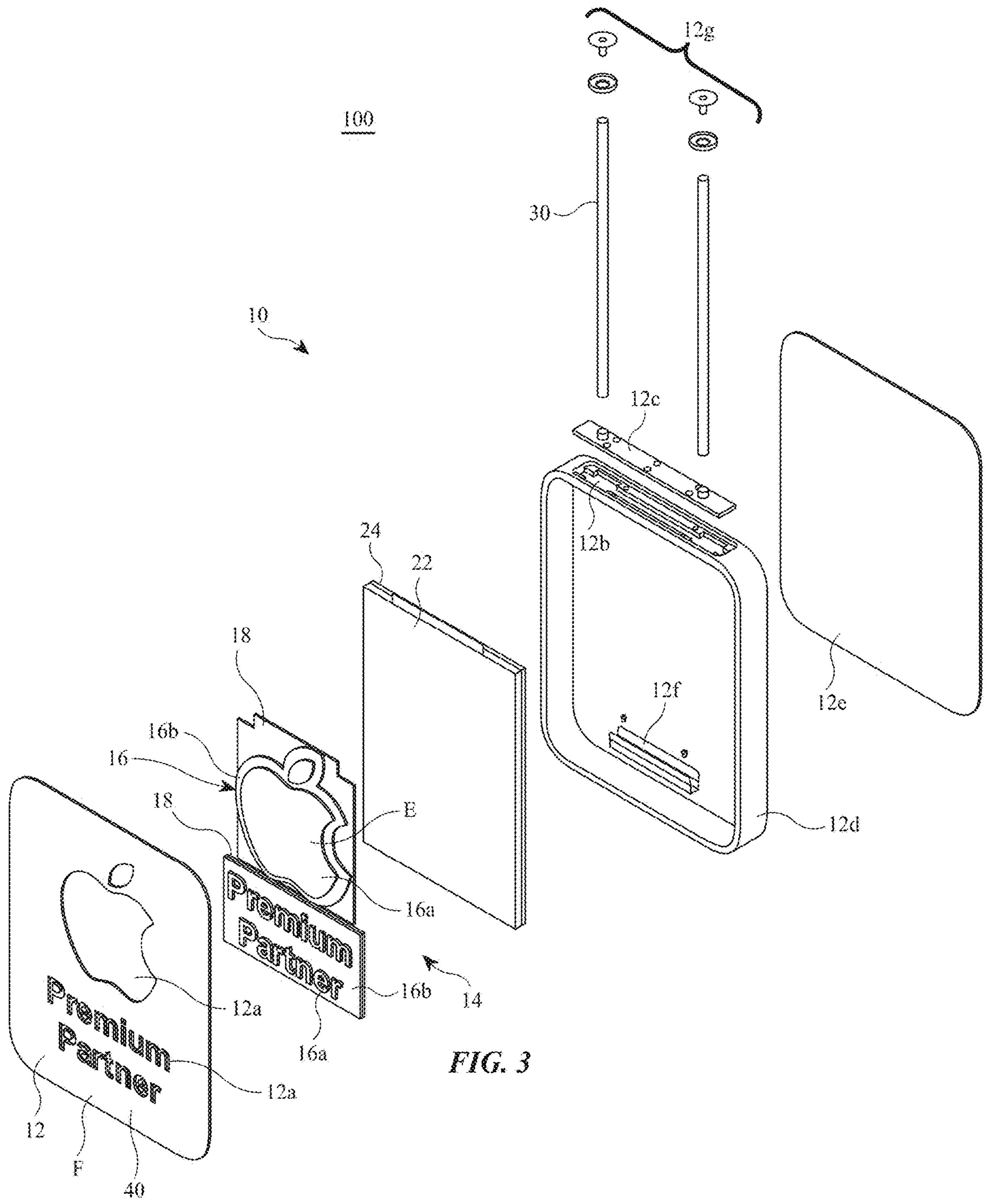
FIG. 3 shows an exploded view of the signage assembly.
Figure 4:
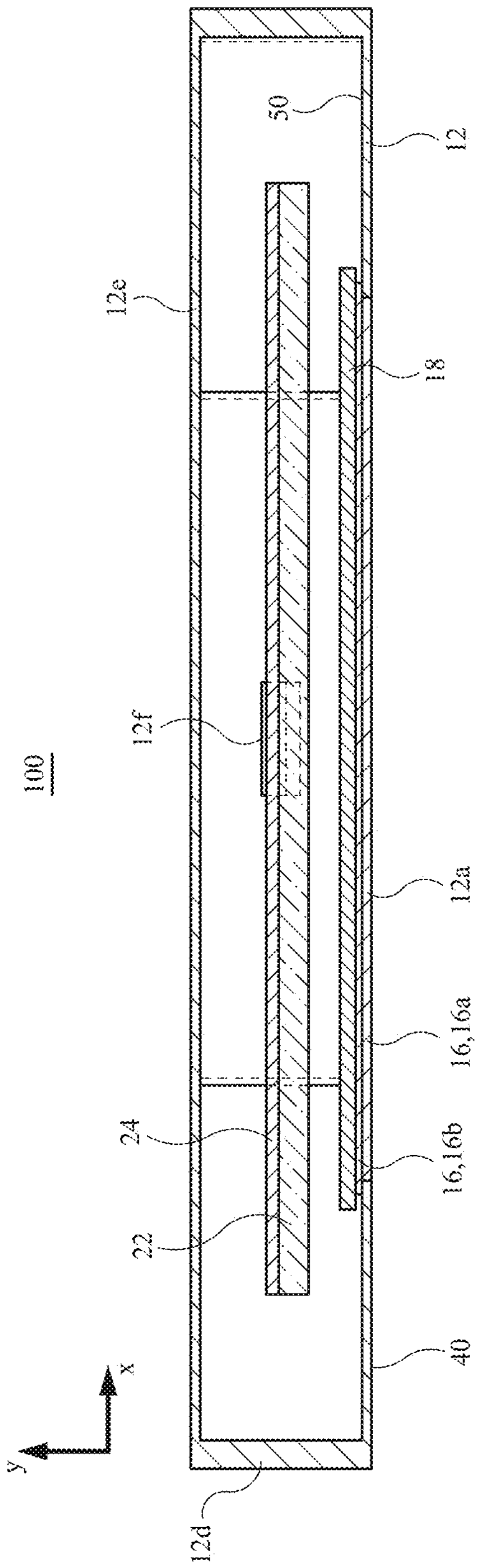
FIG. 4 shows a cross-section of the signage assembly in FIG. 1 taken along line IV-IV of FIG. 1.

FIG. 3 shows an exploded view of signage assembly 100 according to some embodiments, and FIG. 4 shows a cross-section of signage assembly 100 taken along line IV-IV of FIG. 1.

As shown, signage assembly 100 includes a housing 10 as an enclosure for securing signage assembly components therein as well as a connection medium for mounting or attaching signage assembly 100. In some embodiments, housing 10 may be assembled with one or more hanging rods 30 for hanging from a structure such as a ceiling. Housing 10 may include one or more panels assembled together, such as a front panel 12, a back panel 12*e*, and an outer frame 12*d*, to contain internal components of signage assembly 100.

Signage assembly 100 further includes a multi-layer translucent lens 14 forming an indicia panel. Multi-layer translucent lens 14 may be formed of acrylic, and may be two layers or more with each layer having different colors and properties. A front surface of lens 14 may be shaped to provide indicia 20, as described above, for signage assembly 100. Signage assembly 100 may further include a powered light source (e.g., light source panel 22) positioned within housing 10 providing a light effect to signage assembly 100. Light source panel 22 may emit an internal light directly to the back of multi-layer translucent lens 14, more specifically, to the rearmost layer of lens 14. Signage assembly 100 is configured to light up indicia 20 by the light from light source panel 22. For instance, in a lighted indoor environment (or outdoor night time environment), light emitted from light source panel 22 may cause indicia 20 to appear visually much brighter than surrounding portions of front panel 12, which may be white, due to illumination by the internal light.

In detail, multi-layer translucent lens 14 may include a front tinted layer 16 laminated on a rear diffusion layer 18. Front layer 16 may be a tinted layer (e.g., tinted darker than the rearmost layer) and rear layer 18 may be a diffusion layer in a bright color (e.g., frosted white). For example, front tinted layer 16 may have a natural grey color exhibiting a warm gray with a subtle warm undertone, and rear diffusion layer 18 may have an opal/white color. In particular, front tinted layer 16, the color of which is displayed via indicia 20, may have a different color from that of rear diffusion layer 18 and that of front panel 12. Accordingly, in an outdoor daytime environment, high-intensity external light (e.g., from the sun) may reflect off a front surface of indicia 20 formed of tinted grey acrylic and cause indicia 20 to appear darker than the surrounding panel surface, which may be white, and thus which may appear very bright due to the high-intensity external light. Thus, signage assembly 100 can provide high contrast and clear visibility in indoor and outdoor conditions.

In some embodiments, front layer 16 laminated on rear layer 18 may be integrated within front panel 12 of housing 10. In particular, at least a portion of front layer 16 (e.g., protruding portions 16*a*) may have the same shape as openings of front panel 12 (e.g., openings 12*a*) to be tightly fitted therewithin (e.g., outer sides of protruding portions 16*a* are immediately-adjacent to and in contact with inner sides of openings 12*a*), forming indicia 20. The protruding portions 16*a* may be disposed within the openings 12*a* such that the protruding portions 16*a* occupy the entirety of the openings 12*a*. The portion of front layer 16 forming indicia 20 may have a thickness equal to or more than that of front panel 12 such that a front surface of front layer 16 is aligned flush with a front surface of housing 10. Front layer 16 may have a protruding portion 16*a* and a base portion 16*b* from which protruding portion 16*a* protrudes. Protruding portion 16*a* forms the shape (e.g., indicia 20) to be fitted within openings 12*a* of front panel 12. In some embodiments, protruding portion 16*a* is formed by milling the front of front layer 16, and side surfaces of protruding portion 16*a* have a matte perimeter surface (e.g., as a result of the machining process or applied as a separate treatment) to avoid light leakage through the side surfaces. Together the close fit of protruding portions 16*a* within openings 12*a*, the flush positioning of the front surface of protruding portions 16*a* with the front surface of front panel 12, and the matte side surfaces of protruding portions 16*a* help to maintain clear, crisp visual edges of indicia 20 and avoid light leakage from internal light source panel 22, helping to ensure that light from light source panel 22 exits only through front surfaces of front layer 16 forming indicia 20. Though these features work together in this way, each makes an individual contribution and could be used independently or in different combinations.

In some embodiments, front tinted layer 16 and rear diffusion layer 18 may be translucent (e.g., translucent acrylic) with certain light transmission rates. The light transmission rate for each of front tinted layer 16 and rear diffusion layer 18 may be same, or different from each other. For instance, front tinted layer 16 may have a light transmission rate higher or lower than that of rear diffusion layer 18. In some embodiments, front tinted layer 16 and rear diffusion layer 18 may have light transmission rates in a range of 60%-70% at UV light wavelength of 380 nm-790 nm. In some embodiments, front tinted layer 16 may have a light transmission rate of 61% at UV light wavelength of 380 nm-790 nm, and rear diffusion layer 18 may have a light transmission rate of 67% at UV light wavelength of 380 nm-790 nm. In other words, light transmission rate of front tinted layer 16 may be lower than that of rear diffusion layer 18. In this case, rear diffusion layer 18 may thus provide higher light transmission with moderate diffusion. Light transmission measurements are obtained from the standard test method on apparatus conforming to ASTM D1003, Illuminant C. When front tinted layer 16 has a light transmission rate lower than that of rear diffusion layer 18, light can pass through rear diffusion layer 18 thus illuminating the light through front tinted layer 16.

As described above, signage assembly 100 includes light source 22 (e.g., a light source panel 22) for providing a powered internal light. Light source panel 22 may be a single sheet of translucent material (e.g., acrylic) and provided with a plurality of Light-Emitting Diodes (LEDs) at or near one or more edges of light source panel 22 to propagate light within the body of light source panel 22. The edges of light source panel 22 may be provided with reflective material to reflect the light internally. In some embodiments, light source panel 22 may have LEDs at its top edge, bottom edge or side edges, not limited hereto as long as light source panel 22 can provide evenly distributed light. It is also noted that the light source for light source panel 22 is not limited to LEDs and may also include fluorescent lamps, incandescent lamps, cold-cathode or compact fluorescent lamps, halogen, mercury-vapor, sodium-vapor, metal halide, electroluminescent lamps or sources, lasers, etc. Each light source may have any suitable shape, including compact two-dimensional or elongated one-dimensional shapes.

In some embodiments, light source panel 22 may have a thickness of in a range of 5 mm-12 mm. Light source panel 22 may be formed of acrylic and supported at its back by a light source frame 24. Frame 24 may be made of an aluminum or aluminum composite material and may be highly reflective (e.g., white) such that when the light scattering within light source panel 22 exits the rear thereof it can be reflected back to light source panel 22. Frame 24 can be removably placed on a guide flange 12*f* at the bottom of housing 10 so as to be able to remove light source panel 22 (e.g., for servicing or replacement). For this, housing 10 has top opening 12*b* to place light source panel 22 and is covered by a top cover 12*c* to prevent light escaping from housing 10. In addition, frame 24 may be screw-connected with top cover 12*c* such that light source panel 22 can be securely positioned inside housing 10, avoiding any movement therein.

Referring to FIG. 4, light source panel 22 may be spatially arranged between front panel 12 and back panel 12*e* of housing 10, emitting light toward rear diffusion layer 18. In addition, light source panel 22 may have a surface area greater than multi-layer translucent lens 14 to cover light emission to the entire area of multi-layer translucent lens 14. In some embodiments, light source panel 22 may be spaced apart from multi-layer translucent lens 14 (e.g., by a distance at least the thickness of lens 14).

In some embodiments, corners or edges of outer frame 12*d* may be rounded to have a certain radius. In some embodiments, multi-layer translucent lens 14 may be adjacently disposed to the back surface of front panel 12 (e.g., a portion of lens 14 is in contact with the back surface of front panel 12) while front tinted layer 16 or a portion thereof (e.g., protruding portion 16*a*) may protrude out to be fitted within opening 12*a* of front panel 12.

In some embodiments, protruding portions 16*a* have a thickness less than a total thickness of front tinted layer 16, such that a portion of tinted layer 16 extends around protruding portions 16*a* of tinted layer. This can help all protruding portions 16*a* remain in relative position and aligned together and receive consistent light from light source panel 22. Further, while protruding portions 16*a* extend into openings 12*a*, the non-protruding base portion 16*b* of tinted layer 16 is disposed behind front panel 12 (e.g., in contact with front panel 12 as shown in FIGS. 4-6.) As described above, the thickness of protruding portion 16*a* may be equal to that of front panel 12, and in some embodiments, the thickness of protruding portion 16*a* may be equal to or greater than that of flat portion 16*b*. Further, in some embodiments, the thickness of front tinted layer 16 may be equal to that of rear diffusion layer 18. In some embodiments, the indicia 20 are all monolithically connected through the flat portion 16*b*.

Figure 5A:
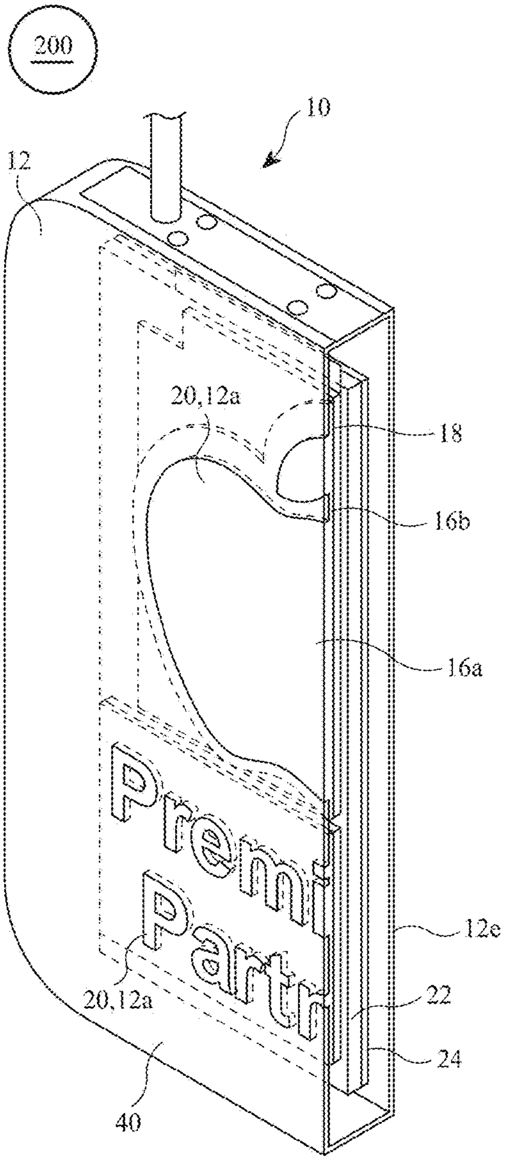
FIG. 5A shows a partial sectional view showing an interior of the signage assembly under a low intensity external light condition.
Figure 5B:
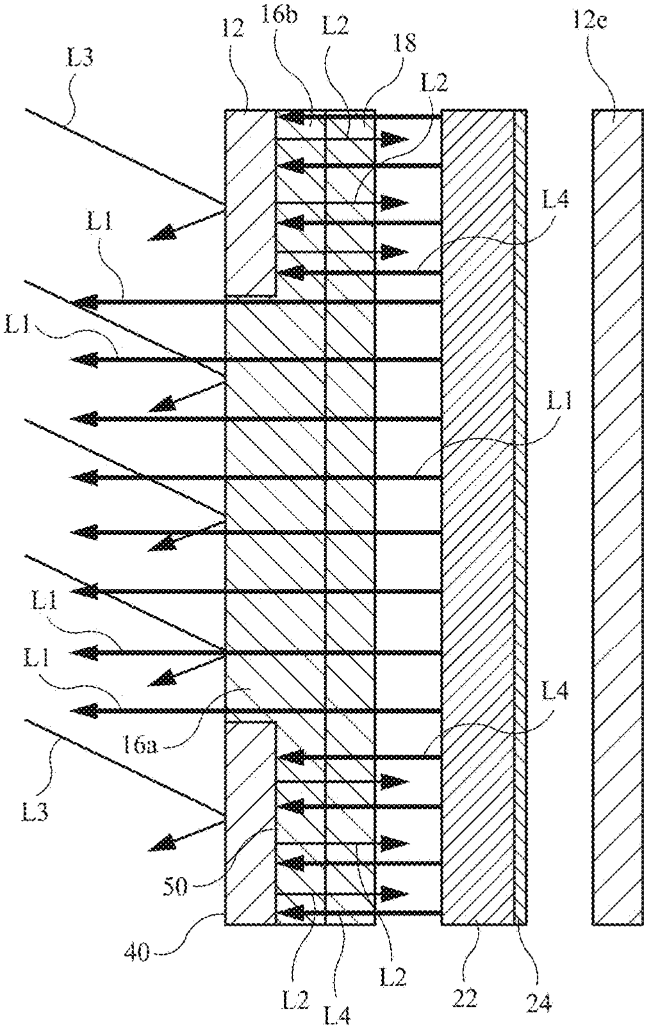
FIG. 5B shows a schematic view of portion 5B of FIG. 5A showing light pathways under a low intensity external light condition.
Figure 6A:
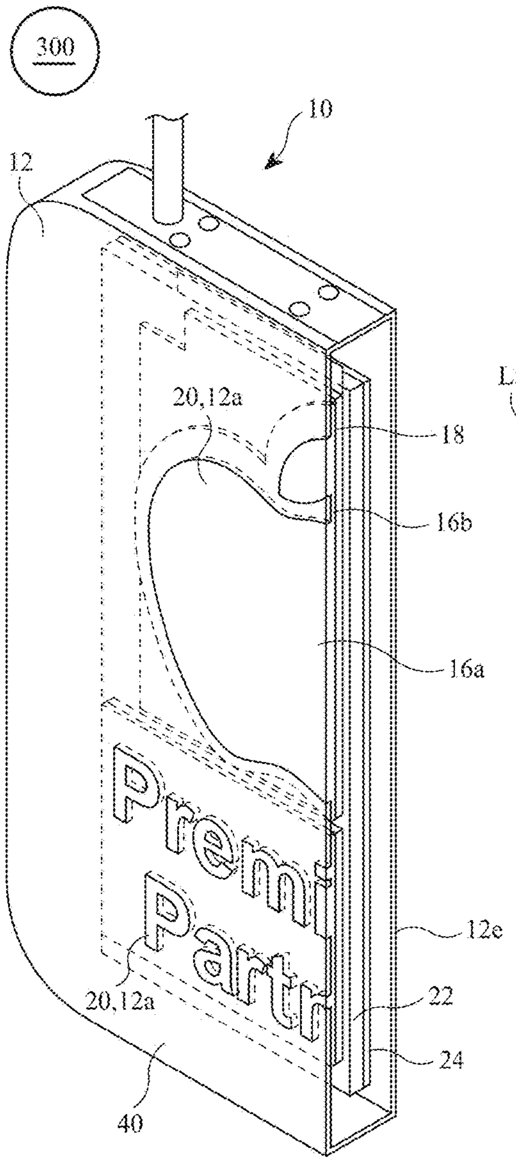
FIG. 6A shows a partial sectional view showing an interior of the signage assembly under a high intensity external light condition.
Figure 6B:
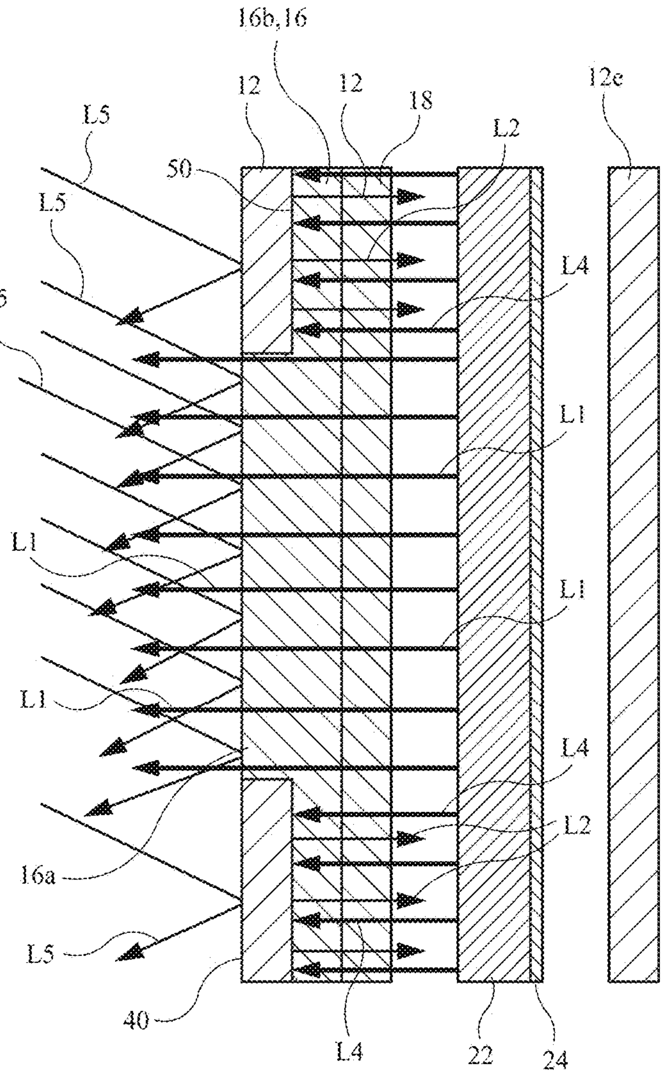
FIG. 6B shows a schematic view of portion 6B of FIG. 6A showing light pathways under a high intensity external light condition.

FIGS. 5A-6B show light pathways transmitting through and reflecting on signage assembly 100 under different light conditions. FIGS. 5A and 6A show a cross-section of the signage assembly in FIG. 1 taken along line V-V of FIG. 1, and FIGS. 5B and 6B show schematic views of portions 5B and 6B of FIGS. 5A and 6A, respectively.

FIGS. 5A and 5B describe light pathways under a first external light condition. The first light condition is a low intensity external light 200 condition. Low intensity external light 200 may be ambient indoor light which provides natural or warm white light. It is assumed that signage assembly 100 is powered on for light source panel 22 to light up. Thus, under the low intensity external light condition, signage assembly 100 receives internal and external lights, both having relatively low intensity light, or the internal light from light source panel 22 may have a stronger light intensity than external light 200. Low intensity external light 200 may refers to a situation in which the external light has a lower intensity than the internally provided light.

Referring to FIG. 5B, light paths L1 from light source panel 22 having a relatively high light intensity pass through multi-layer translucent indicia lens 14, in other words, the internal light can pass through all of rear diffusion layer 18, protruding portion 16*a*, flat portion 16*b* and escapes outside. As described above, rear diffusion layer 18 has a higher light transmission rate than front tinted layer 16, and thus, the light from light source panel 22 can mostly pass through rear diffusion layer 18 illuminating light through front layer 16. Therefore, light that passes through multi-layer translucent indicia lens 14 illuminates indicia 20. Some of the internal light transmitting through multi-layer translucent indicia lens 14 directly emits to front panel 12 as light paths L4 which reflect on a rear surface "50" of front panel 12 and back toward light source panel 22 as lights paths L2 scattering inside housing 10. Front panel 12 is solid and opaque thus visible light cannot pass therethrough.

Signage assembly 100 is exposed to external light 200 directing to front surface "40" of front panel 12 forming light paths L3. Since external light 200 in this example is relatively low intensity (e.g., from internal electric lights, reflected off of interior surfaces) the light in light paths L1 from light source panel 22 are dominant over the light in light paths L3. Therefore, even though front layer 16 is tinted (e.g., tinted grey), it still has a sufficient light transmission rate (e.g., 61%), such that light passing through rear diffusion layer 18 via light paths L1 can illuminate front tinted layer 16 (and indicium 20) to appear much brighter than front panel 12, providing strong legibility and contrast for indicia 20. Therefore, signage assembly 100 clearly conveys signage information while maintaining specific aesthetic appearance, in particular on a white background formed by the front surface of front panel 12.

Low intensity external light 200 may further include outdoor daytime indirect sunlight (e.g., the sign is shaded by a building, a tree, a person, etc.) or later time of the day, where the intensity of sunlight is significantly reduced. Under the indirect sunlight condition, internally-originated light paths L1 are dominant over externally-originated light paths L3. Therefore, indicium 20 appears much brighter than front panel 12 of housing 10 similar to the above-described ambient light condition, thus providing high legibility even in the outdoor environment without any adjustment in the light settings of signage assembly 100.

FIGS. 6A and 6B describe light pathways under a second external light condition. The second light condition is a high intensity external light 300 condition. High intensity external light 300 includes direct daytime sunlight, and signage assembly 100 may be mounted outside a retail store receiving sunlight. In some embodiments, direct sunlight may refer to incident sunlight without the sunlight being interrupted by an object (e.g., afternoon sunlight on a clear day). For example, direct sunlight may have an illuminance of or higher than, e.g., 30,000 lux or 6,000 lumens, while indirect sunlight may have an illuminance, e.g., below 30,000 lux or 6,000 lumens. High intensity external light 300 may refers to any situation in which the external light is a direct light with a higher intensity than the internally provided light.

Under the high intensity external light condition, light source panel 22 still emits light internally to multi-layer translucent indicia lens 14 in light paths L1, which travels outside through multi-layer translucent indicia lens 14. The internal light also travels in light paths L4, which emits to the rear surface of front panel 12 and reflects back toward light source panel 22 passing through multi-layer translucent indicia lens 14. The light intensity of light source panel 22 remains the same in any condition.

Under the high intensity external light condition, signage assembly 100 receives direct external daytime sunlight 300 with high light intensity which dominates over internal light emitting from light source panel 22. Light paths L5 shown in FIG. 6B are thus presented in thicker lines and the number thereof has increased compared to light paths L3 of the low intensity external light condition to clearly distinguish between the two light conditions. In this case, even though powered light source panel 22 provides light that can travel through multi-layer translucent indicia lens 14, direct sunlight 300 in light paths L5 reflecting on front panel 12 as well as on indicium 20 of front tinted layer 16 dominates over the internal lights in light paths L1. Such high-intensity light reflecting off of white front panel 12 causes it to appear very bright, which would have a tendency to overwhelm the lower-intensity light emitted by light source panel 22, which would cause indicia 20 to appear washed out and less distinct in comparison to front panel 12. However because front tinted layer 16 is tinted light grey, it maintains its light grey color by virtue of the high-intensity exterior light reflecting off of it and taking on its tinted color. Thus, indicia 20 maintains its own appearance of light grey clearly distinct from and in sharp contrast with front panel 12, which appears bright white, thus providing high legibility under direct sunlight, without any adjustment in the light settings of signage assembly 100. Emitted light from light source panel 22 does not change between the low intensity external light condition and the high intensity external light condition. That is, the internal light settings and characteristics of light source panel 22 and signage assembly 100 under the high intensity external light condition remain unchanged compared to the internal light settings and characteristics of light source panel 22 signage assembly 100 under the low intensity external light condition.

FIG. 2 provides a representative example of a beneficial output of signage assembly 100. Signage assembly 100 is situated outdoors on a sunny day, and half of front panel 12 and indicia 20 is in shade. In this condition the left side of front panel 12, which is in direct sunlight, appears a much brighter white than does the right side of front panel 12, which is shaded. Yet indicia 20 remains in high contrast to both sides, and does not show visual evidence across itself of the transition between shaded and unshaded portions. This is because the incident sunlight is reflecting off of and taking on the tinted color of front tinted layer 16. Thus, even under this complex light condition the appearance of indicia 20 remains consistent, and with high contrast and visibility relative to front panel 12.

Further, in a situation where light source panel 22 does not provide internal light (e.g., in a power outage), indicia 20 appears in its natural grey color of front tinted layer 16 while front panel 12 appears its white color, thus providing high legibility, similar to the outdoor high direct daytime sunlight condition.

As above, signage systems of some embodiments can provide strong visibility in any light conditions without requiring manipulation or any change of signage assembly 100.

Figure 7A:
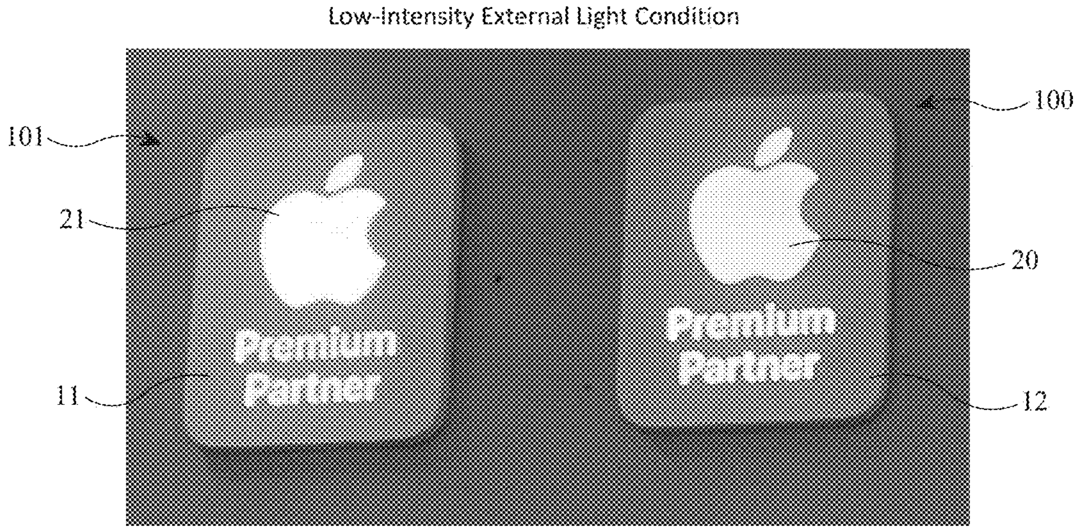
FIGS. 7A and 7B show photographic views of the signage assembly according to some embodiments alongside a comparative example signage assembly.
Figure 7B:
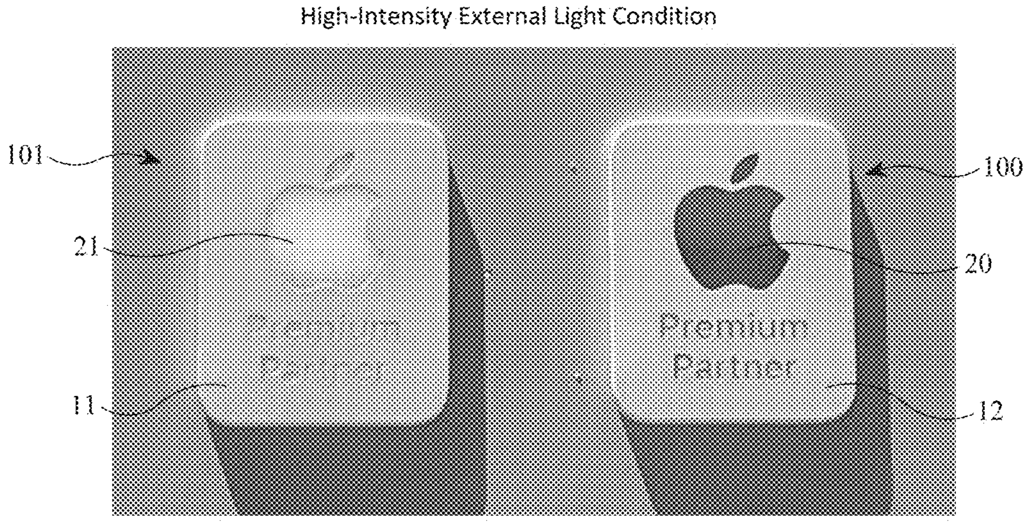

FIGS. 7A and 7B show further examples of photographs of an example signage assembly 101 and signage assembly 100 according to some embodiments in different light conditions.

FIG. 7A is a photograph of example signage assembly 101 as a comparative example and signage assembly 100 under the low-intensity external light condition described above with reference to FIGS. 5A and 5B. Comparative example signage assembly 101 does not include a multi-layer (e.g., frosted layer and a tinted layer) or tinted lens as described with reference to signage assembly 100. Instead, comparative example signage assembly 101 includes only a single layer lens forming its indicia 21, illuminated internally. As shown, example signage assembly 101 and signage assembly 100 have powered light source panels installed therein providing light internally to illuminate indicia 21 and indicia 20, respectively. Color or brightness contrast between front panel 12 and indicia 20 in signage assembly 100 is comparable, but stronger than contrast between a front panel 11 and indicia or indicium 21 of signage assembly 101.

FIG. 7B is a photograph of comparative example signage assembly 101 and signage assembly 100 under the high-intensity external light condition described above with reference to FIGS. 6A and 6B. As shown, comparative example signage assembly 101 and signage assembly 100 have powered light source panels installed therein providing light internally to illuminate indicia 21 and indicia 20, respectively. FIG. 7B shows that indicia 20 appears much darker and clearer than indicia 21, with much higher contrast between front panel 12 and indicia 20 than between front panel 11 and indicia 21. There is no difference in the characteristics or operation of signage assembly 100 between FIGS. 7A and 7B, including internal illumination characteristics of light source panel 22.

Figure 8A:
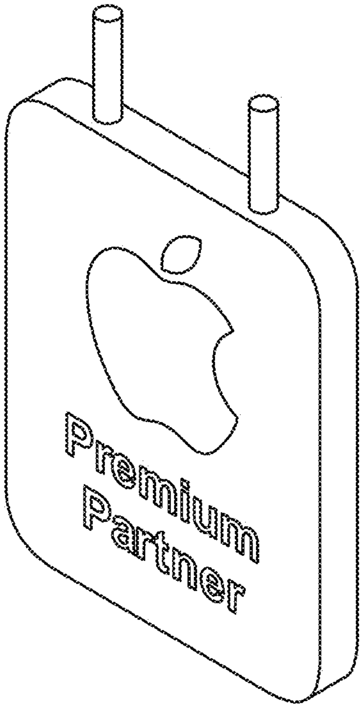
FIGS. 8A-8D show various fixtures for mounting the signage assembly.
Figure 8B:
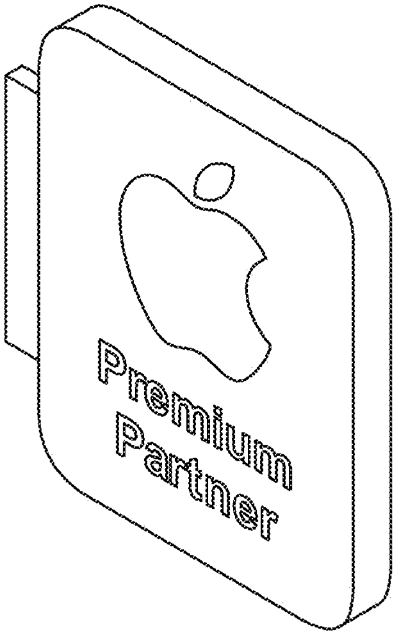
Figure 8C:
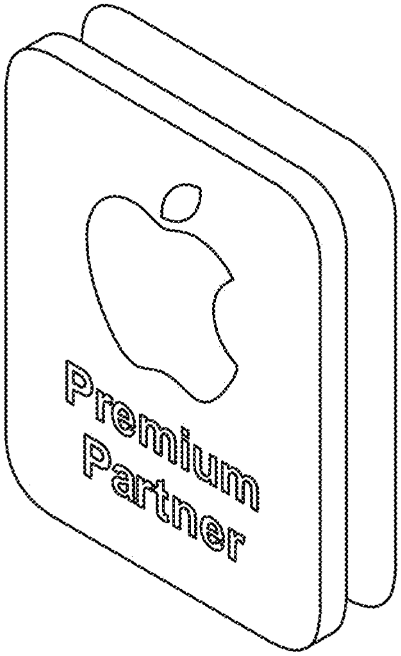
Figure 8D:
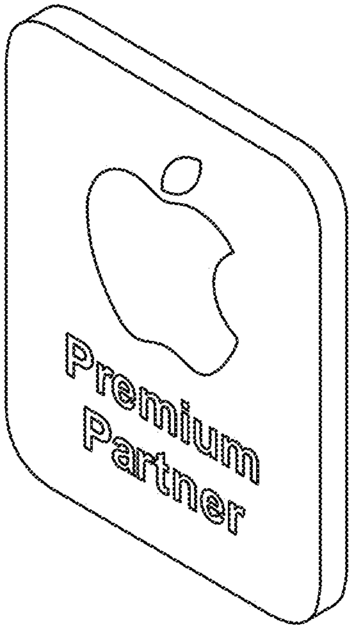

FIGS. 8A-8D show various hanging/mounting fixtures for signage assembly 100. As described above, signage assembly 100 can be formed in various dimensions and shapes to accommodate different mounting styles. For example, signage assembly 100 may be provided in a hanging rod fixture as shown in FIG. 8A, a side wall-mount blade fixture, either left side mounted or right side mounted, as shown in FIG. 8B, a glass-mounted fixture as shown in FIG. 8C to mount on a glass surface, and a fascia mounted fixture as shown in FIG. 8D for mounting on the front of a retail store or a building. These are merely some examples for mounting signage assembly 100. The mounting or hanging fixture of signage assembly 100 is not limited to the examples of FIGS. 8A-8D. In addition, any of the mounting or hanging fixture can be varied in sizes (e.g., thickness, width, length, etc.) according to the dimension of signage assembly 100.

Figure 9A:
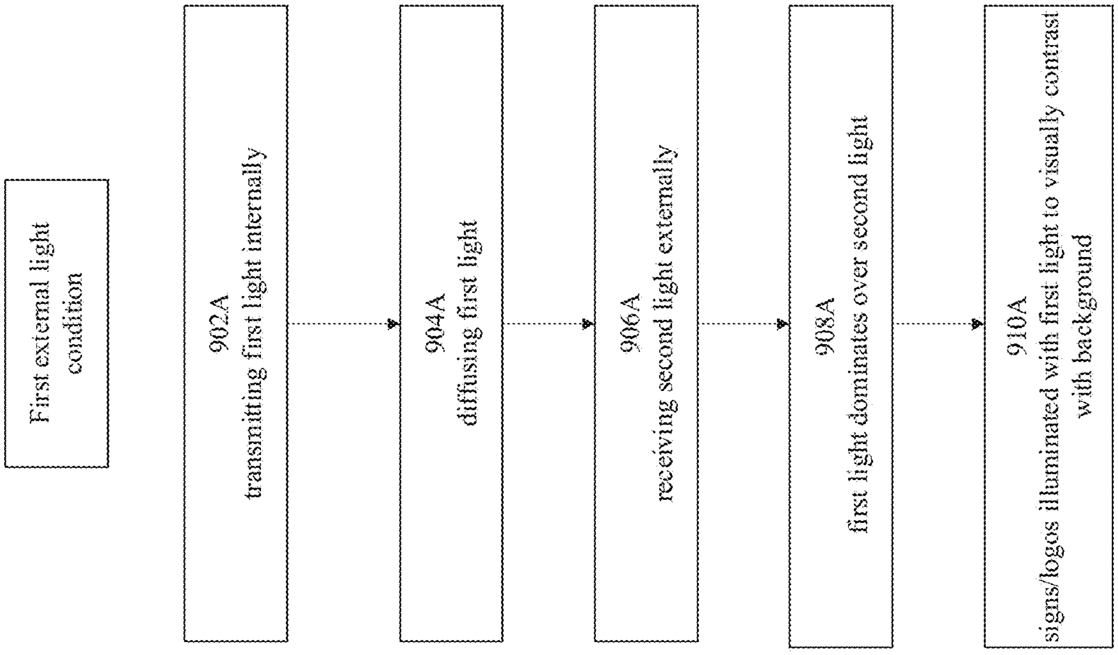
FIGS. 9A and 9B show flow diagrams of the signage assembly under a low-intensity external light condition and a high-intensity external light condition, respectively.
Figure 9B:
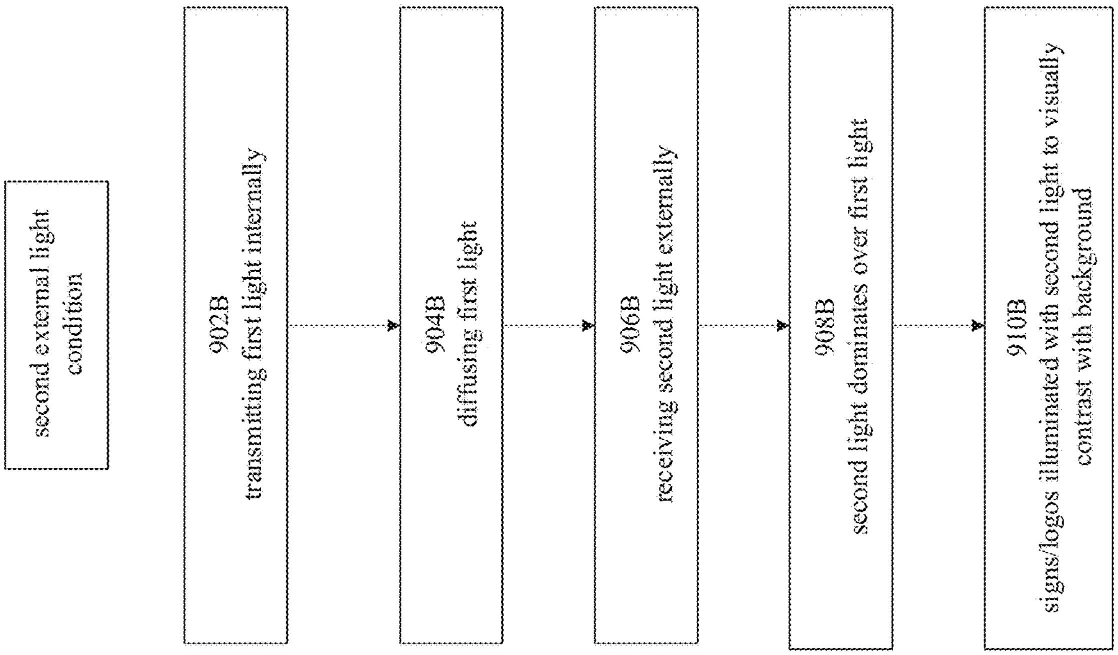

FIGS. 9A and 9B show flow diagrams for maintaining clear visibility of indicia under a first external light condition and a second external light condition, respectively.

Referring to FIG. 9A, under a first external light condition, e.g., low-intensity external light condition, at block 902A, a first light is transmitted internally. For example, an internal light source may provide the first light to be transmitted. At block 904A, the transmitted first light is then diffused. In embodiments where the described process is performed relative to a signage assembly such as signage assembly 100, signage assembly 100 may include a first layer through which the first light passes or is transmitted and a second layer by which the transmitted first light is diffused. The first and second layers may be in the form of layers or any other structural form that allows light to pass or diffuse. In addition, the first and second layers may have differently defined light characteristics (e.g., light transmissivity).

At block 906A, a second light, e.g., external environment light, is received in an opposite direction to a travel direction of the first light (see, e.g., FIGS. 5A and 5B). Under the first external light condition or low-intensity external light condition (e.g., indoors in a retail store), the first light dominates over the second light, at block 908A. At block 910A, the dominant first light is illuminated on, e.g., signs or logos, to cause such indicia to appear lighter than, and visually contrast with, a background or surrounding surface (e.g., of signage assembly 100, as shown in FIG. 7A).

Referring to FIG. 9B, under a second external light condition, e.g., high-intensity external light condition. Light travel under the second external light condition in blocks 902B-906B is similar to the light travel under the first external light condition in blocks 902A-906A of FIG. 9A. That is, there is no change in light source (e.g., internally provided light) or conditions of signage assembly 100, between two different external light conditions.

At block 908B, the second light dominates over the first light under the second external light condition, contrary to block 908A (see, e.g., FIGS. 6A and 6B). Under the second external light condition or high-intensity external light condition (e.g., outdoors in sunlight), external light reflects off, e.g., signs or logos, causing such indicia to appear darker than, and visually contrast with, the background or surrounding surface (e.g., of signage assembly 100, as shown in FIG. 7B). That is, the visual contrast between the signs/logos and surrounding area around the signs/logos is inverted under the second external light condition, without any additional intervention (e.g., manual or automatic changing the first light condition, sensor devices, or the like).

The above description describes a contrast in appearance between a displayed indicia and its surrounding area. For example, between indicia 20 and front panel 12 of signage assembly 100. Such contrast in appearance can be due to any characteristic that provides visually distinguishable differences. For example, such contrast in appearance can be due to differences in color (including differences in hues, tints, tones, and shades, individually or in combination).

Each of the components and their constituent parts, and other variations described herein may include corresponding features described with reference to each of the other components and features described without limitation.

As described above, one aspect of the present technology is providing a signage system which can be used in any light condition, either outdoor or indoor, while maintaining specific aesthetic requirements and high legibility without manipulation or interruption of light settings even when any of light condition or environment has unexpectedly changed. In addition, the present technology is not limited to a signage system but could be applied to other products, such as phones, laptops, tablets, etc., that are provided with logos, signs, etc. on the products.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A powered signage assembly comprising:
- a front housing panel having an opening;
- a multi-layer translucent lens comprising:
  - a front tinted layer; and
  - a rear diffusion layer laminated with the front tinted layer; and
- a light source panel disposed to the rear of the lens;
- wherein the front tinted layer comprises a protrusion forming an indicium fitted within the opening and having a front surface flush with a front surface of the front housing panel, and
- wherein light from the light source panel is diffused by the rear diffusion layer and transmitted through the front tinted layer, such that the indicium is illuminated to visually contrast with the front surface of the front housing panel such that:
  - in a first external light condition, the indicium appears brighter than the front surface of the front housing panel, and
  - in a second external light condition, the indicium appears darker than the front surface of the front housing panel.

2. The signage assembly of claim 1, wherein the front tinted layer is tinted darker than the rear diffusion layer.

3. The signage assembly of claim 2, wherein the indicium is illuminated to contrast with the front surface in the first external light condition and in the second external light condition without changing light output characteristics of the light source panel.

4. The signage assembly of claim 2, wherein in the first external light condition, light from the light source panel that is diffused by the rear diffusion layer dominates and passes through the front tinted layer, causing the indicium to appear brighter, and wherein in the second external light condition, light from outside the signage assembly dominates and is reflected off of the front tinted layer, causing the indicium to appear darker.

5. The signage assembly of claim 1, wherein in the first external light condition, indirect light incident on the indicium dominates, and wherein in the second external lighting condition, direct light incident on the indicium dominates.

6. The signage assembly of claim 1, wherein in the first external light condition, incident light on the indicium is lower intensity light, and wherein in the second external lighting condition, incident light on the indicium is higher-intensity light.

7. The signage assembly of claim 1, wherein the front surface of the front housing panel is not illuminated by the signage assembly.

8. The signage assembly of claim 7, wherein in the first external light condition, the indicium appears lighter than the front surface of the front housing panel, and wherein in the second external light condition, the indicium appears darker than the front surface of the housing panel.

9. The signage assembly of claim 1, wherein the front housing panel has multiple openings, wherein the front tinted layer comprises multiple protrusions forming indicia, each fitted within one of the multiple openings and each having a front surface flush with the front surface of the front housing panel, wherein the front tinted layer includes:

a protruding portion forming the indicia; and a flat portion, from which the protruding portion protrudes, laminated to the rear diffusion layer, and wherein the indicium is all monolithically connected through the flat portion.

10. The signage assembly of claim 9, wherein the protruding portion has a matte perimeter surface.

11. The signage assembly of claim 9, wherein the rear diffusion layer has a surface area equal to or greater than that of the flat portion of the front tinted layer.

12. The signage assembly of claim 1, wherein the housing further includes a back panel and an outer frame, each of which is configured to be assembled with the front housing panel so that light does not escape the signage assembly except through the indicium.

13. The signage assembly of claim 1, wherein the front tinted layer has lower light transmission than that of the rear diffusion layer.

14. The signage assembly of claim 13, wherein the front tinted layer is formed of a first acrylic with 61% light transmission and the rear diffusion layer is formed of a second acrylic with 67% light transmission, at wavelength of 380 nm-790 nm.

15. The signage assembly of claim 14, wherein the first acrylic is natural grey color and the second acrylic is opal white.

16. The signage assembly of claim 1, wherein the light source panel includes a plurality of Light-Emitting Diodes (LEDs) arranged around an edge or at a top of the light source panel.

17. The signage assembly of claim 1, wherein the front housing panel is formed of aluminum, and wherein the front surface of the front housing panel is colored white.

18. The signage assembly of claim 1, wherein the front tinted layer has a thickness that is substantially the same as that of the rear diffusion layer.

19. Powered retail signage comprising:

a front display panel having openings therethrough;

a multi-layer translucent panel comprising:

a front tinted layer comprising protrusions, the protrusions disposed within the openings such that the protrusions occupy the entirety of the openings; and a rear diffusion layer laminated to the front tinted layer; and an internal light source, wherein the multi-layer translucent panel is configured to effect visual contrast between the protrusions and the front display panel such that:

in an indirect external light condition, the protrusions appear illuminated relative to the front display panel due to light emitted through the protrusions from the internal light source, and in a direct external light condition, the protrusions appear darker than in the indirect external light condition due to external light reflected off of the protrusions.

20. The powered retail signage of claim 19, wherein the multi-layer translucent panel is disposed in a housing having a white colored front panel, wherein front surfaces of the protrusions are flush with a front surface of the front display panel.

21. The powered retail signage of claim 19, wherein the indirect external light condition includes an ambient light condition and an indirect outdoor sunlight condition, and wherein the direct external light condition includes a direct outdoor sunlight condition.

22. A powered retail signage system comprising:

a housing comprising a front panel, the front panel having an opening therethrough and a white colored front surface, the housing forming an enclosure;

a multi-layer translucent indicia panel comprising:

a front tinted layer formed of a translucent acrylic and comprising an integral protrusion forming an indicium fitted within the opening, wherein the protrusion has a front surface flush with the front surface of the front panel of the housing; and a rear diffusion layer formed of a translucent acrylic and laminated to a back of the front tinted layer; and an internal light source panel disposed within the enclosure spaced apart from the indicia panel and configured to provide an internal light, wherein the light source panel emits light toward the rear diffusion layer, wherein the light from the light source panel is diffused by the rear diffusion layer and transmitted through the front tinted layer, such that the indicium is illuminated to visually contrast with the front surface of the front panel throughout changing exterior light conditions without changing light output characteristics of the light source panel, wherein in a first external light condition, the indicium appears brighter than the front surface of the front housing panel, and in a second external light condition, the indicium appears darker than the front surface of the front housing panel.

23. The system of claim 22, wherein the front tinted layer is tinted darker than the rear diffusion layer, wherein in the first external light condition, light from the internal light source panel that is diffused by the rear diffusion layer is brighter than external light incident on the front panel and passes through the front tinted layer, causing the indicium to appear brighter than the front panel, and wherein in the second external light condition, light from outside the signage system that is reflected by the front tinted layer is brighter than light from the internal light source panel, causing the indicium to appear darker than the front panel.

24. The system of claim 22, wherein the translucent acrylic of the rear diffusion layer is white and the translucent acrylic of the front tinted layer is tinted grey.

25. A retail signage system comprising:

a housing configured to enclose an internal light source therein, the housing comprising a front surface having an opening therethrough;

an indicium fitted within the opening on the front surface; and the internal light source disposed within the housing, wherein in a first external light condition, light from the internal light source causes the indicium to appear brighter than the front surface, wherein in a second external light condition, external light causes the indicium to appear darker than the front surface, and wherein the first external light condition is relatively lower-intensity external incident light, and wherein the second external light condition is relatively higher-intensity external incident light.

26. The system of claim 25, wherein light from the internal light source does not change between the first external light condition and the second external light condition.

27. The system of claim 26, wherein in the second external light condition external light dominates over light emitted by the internal light source and reflects off of tinted material of the indicium, taking on a darker appearance than the front surface.

28. A method for displaying indicia with clear contrast in different environments, the method comprising:

transmitting a first light in a first direction through displayed indicia;

diffusing the first light;

receiving a second light externally from an environment surrounding the indicia, in an opposite direction to the first direction; and reflecting the second light off of the indicia toward the first direction, wherein, under a first environmental light condition of the second light, the indicia appears lighter than a surface immediately surrounding the indicia, and wherein, under a second environmental light condition of the second light, the indicia appears darker than the surface immediately surrounding the indicia.

29. The method of claim 28, wherein in the first environmental light condition and in the second environmental light condition the appearance of the indicia remains the same.

30. The method of claim 28, wherein in the first environmental light condition, the second light is lower-intensity light, and wherein in the second environmental light condition, the second light is higher-intensity light.

31. The method of claim 28, wherein the first light remains the same in the first environmental light condition and in the second environmental light condition.

* * * * *